(12) United States Patent
Natori

(10) Patent No.: US 10,166,990 B2
(45) Date of Patent: Jan. 1, 2019

(54) VEHICLE

(71) Applicant: TOYOTA JIDOSHA KABUSHIKI KAISHA, Toyota-shi, Aichi-ken (JP)

(72) Inventor: Akio Natori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 15/487,851

(22) Filed: Apr. 14, 2017

(65) Prior Publication Data

US 2017/0297579 A1    Oct. 19, 2017

(30) Foreign Application Priority Data

Apr. 19, 2016 (JP) ................................. 2016-083980

(51) Int. Cl.
*B60W 10/184* (2012.01)
*B60W 30/192* (2012.01)
*F02D 11/02* (2006.01)
*B60W 10/107* (2012.01)
(Continued)

(52) U.S. Cl.
CPC ........ *B60W 30/192* (2013.01); *B60W 10/107* (2013.01); *B60W 10/184* (2013.01); *B60W 30/18136* (2013.01); *B60W 30/20* (2013.01); *F02D 11/02* (2013.01); *B60W 2030/206* (2013.01); *B60W 2520/10* (2013.01); *B60W 2520/105* (2013.01); *B60W 2710/1005* (2013.01); *B60W 2710/182* (2013.01); *Y10T 477/621* (2015.01); *Y10T 477/6237* (2015.01);
(Continued)

(58) Field of Classification Search
CPC ........... Y10T 477/6237; Y10T 477/621; Y10T 477/81; Y10T 477/865; B60W 2030/206; B60W 30/192; B60W 30/18136; B60W 10/184; B60W 10/107; B60W 30/20; B60W 2710/182; B60W 2520/105; B60W 2520/10

See application file for complete search history.

(56) References Cited

U.S. PATENT DOCUMENTS 9,470,156 B2 * 10/2016 Mori .................... F02N 11/0822
2009/0018715 A1 * 1/2009 Kanayama ........... B60W 10/115
                                                         701/22
2010/0211274 A1    8/2010 Yamaguchi

FOREIGN PATENT DOCUMENTS

CA         2315616 C  * 12/2003 ............. B60K 6/485
JP       2010-188911 A     9/2010
JP       2011-007236 A     1/2011
(Continued)

*Primary Examiner* — Roger L Pang
(74) *Attorney, Agent, or Firm* — Oliff PLC

(57) ABSTRACT

A vehicle includes an engine, a continuously variable transmission, an engine stop system, and a brake system. The brake system is configured to control a braking force of the wheel based on an operation state of a brake operating portion that is operated by a driver. The brake system includes a braking force adjusting device. The braking force adjusting device includes an actuator and an electronic control unit. The actuator is configured to adjust a braking force of the wheel. The electronic control unit is configured to, when the engine stop system stops the driving of the engine, control the actuator such that slip of a belt of the belt-type continuously variable transmission relative to the pulley becomes less than or equal to a predetermined allowable limit.

4 Claims, 6 Drawing Sheets

(51) Int. Cl.
*B60W 30/18* (2012.01)
*B60W 30/20* (2006.01)
(52) U.S. Cl.
CPC .......... *Y10T 477/81* (2015.01); *Y10T 477/865* (2015.01)

(56) References Cited

FOREIGN PATENT DOCUMENTS

JP  2014-040152 A   3/2014
WO  2012/147165 A1  11/2012

\* cited by examiner

VEHICLE

INCORPORATION BY REFERENCE

The disclosure of Japanese Patent Application No. 2016-083980 filed on Apr. 19, 2016 including the specification, drawings and abstract is incorporated herein by reference in its entirety.

BACKGROUND

1. Technical Field

The present disclosure relates to a vehicle and, in particular, relates to a vehicle including a belt-type continuously variable transmission and a system that stops an engine while the vehicle is traveling.

2. Description of Related Art

In a vehicle including a belt-type continuously variable transmission, there is a problem that the life of a belt is shortened due to slip of the belt relative to pulleys. On the other hand, there is known a vehicle equipped with a so-called start-stop system, i.e. with a control that automatically stops an engine before the vehicle comes to a stop when predetermined conditions (for determining that the vehicle will stop) are satisfied. In such a vehicle, it is known that when the engine is stopped by the start-stop control, hydraulic pressure for clamping the belt is not supplied to a primary pulley or a secondary pulley of the continuously variable transmission, resulting in that the belt tends to slip relative to the pulleys. As the predetermined conditions for the start-stop control, it is generally known that a brake pedal is depressed, that the speed of the vehicle is less than or equal to a threshold value (e.g. 10 km/h), and that the depression amount of an accelerator pedal is zero.

Japanese Patent Application Publication No. 2011-7236 (JP 2011-7236 A) discloses that, in a vehicle including a system that performs start-stop control, when performing the start-stop control, the gear ratio of a belt-type continuously variable transmission is changed, before performing the start-stop control, to a gear ratio that is determined in advance so as to suppress slip of a belt, thereby suppressing the slip of the belt relative to pulleys in an allowable range.

SUMMARY

As described above, when the start-stop control is performed, the engine is stopped while the vehicle is traveling, and therefore, an oil pump that is driven using power of the engine is also stopped accordingly. Thus, hydraulic pressure for clamping the belt of the continuously variable transmission decreases, so that the belt tends to slip relative to the pulleys. On the other hand, since the brake pedal is depressed, a force (reverse torque) in a direction to stop the rotation of the continuously variable transmission is transmitted to the continuously variable transmission from the wheel side through a power transmission path. Consequently, the belt still more tends to slip relative to the pulleys in the continuously variable transmission.

Therefore, the present disclosure is intended to prevent excessive slip of a belt relative to a pulley when start-stop control, as described above, is performed in a vehicle including a belt-type continuously variable transmission.

A vehicle according to one aspect of the present disclosure includes an engine, a continuously variable transmission, an engine stop system, and a brake system. The engine is configured to generate a hydraulic pressure while the engine is driven. The continuously variable transmission includes a pulley and a belt. The pulley is configured to rotate along with rotation of a wheel of the vehicle. The pulley is configured to clamp the belt by the hydraulic pressure that is generated while the engine is driven. The engine stop system is configured to perform control to stop driving of the engine when a predetermined engine stop condition is satisfied during travel of the vehicle. The brake system is configured to control a braking force of the wheel based on an operation state of a brake operating portion that is operated by a driver. The brake system includes a braking force adjusting device. The braking force adjusting device includes an actuator and an electronic control unit. The actuator is configured to adjust a braking force of the wheel. The electronic control unit is configured to, when the engine stop system stops the driving of the engine, control the actuator such that slip of the belt relative to the pulley becomes less than or equal to a predetermined allowable limit.

In the vehicle according to the above-described aspect, the electronic control unit may be configured to, when the predetermined engine stop condition is satisfied and the driving of the engine is stopped by the engine stop system, control the actuator such that shock that occurs on the vehicle due to stop of the driving of the engine becomes less than or equal to a predetermined level.

In the vehicle according to the above-described aspect, the electronic control unit may be configured to store, during travel of the vehicle, a vehicle speed, a slip ratio, and a deceleration that are obtained when a deceleration greater than or equal to a predetermined level starts to occur on the vehicle by an operation of the brake operating portion by the driver, and the electronic control unit may be configured to correct a control amount, for controlling the actuator, based on the vehicle speed, the slip ratio, and the deceleration obtained when the deceleration greater than or equal to the predetermined level starts to occur on the vehicle.

According to the above-described aspect of the present disclosure, with the configuration described above, there is exhibited an excellent effect such that, in the vehicle including the belt-type continuously variable transmission, when the engine atop condition is satisfied and thus the engine is stopped during the travel of the vehicle, it is possible to prevent excessive slip of the belt relative to the pulley.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment according to the present disclosure rill be described hereinbelow with reference to the accompanying drawings.

Figure 1:
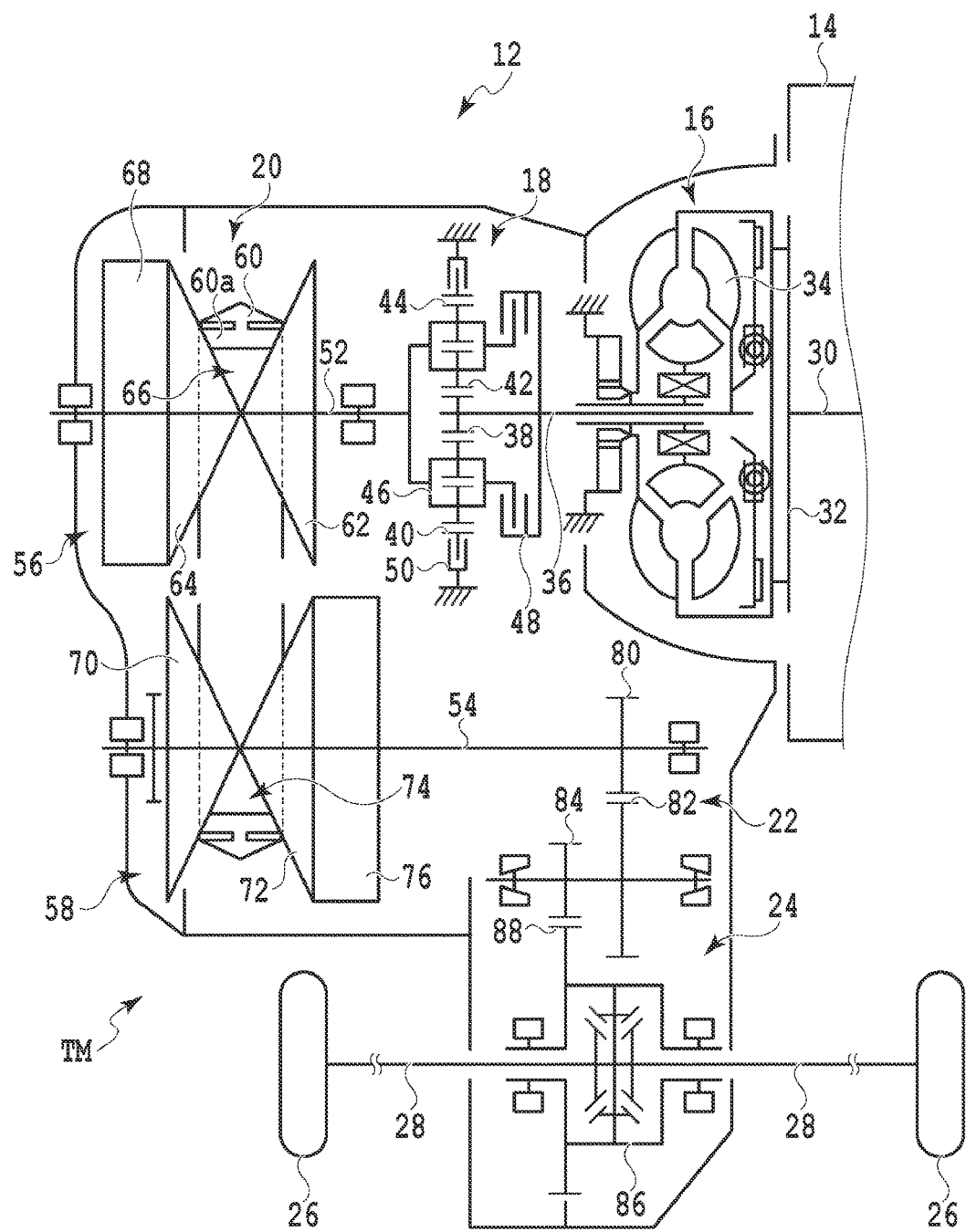
FIG. 1 is a diagram showing a power transmission system in a vehicle according to an embodiment of the present disclosure.
Figure 2:
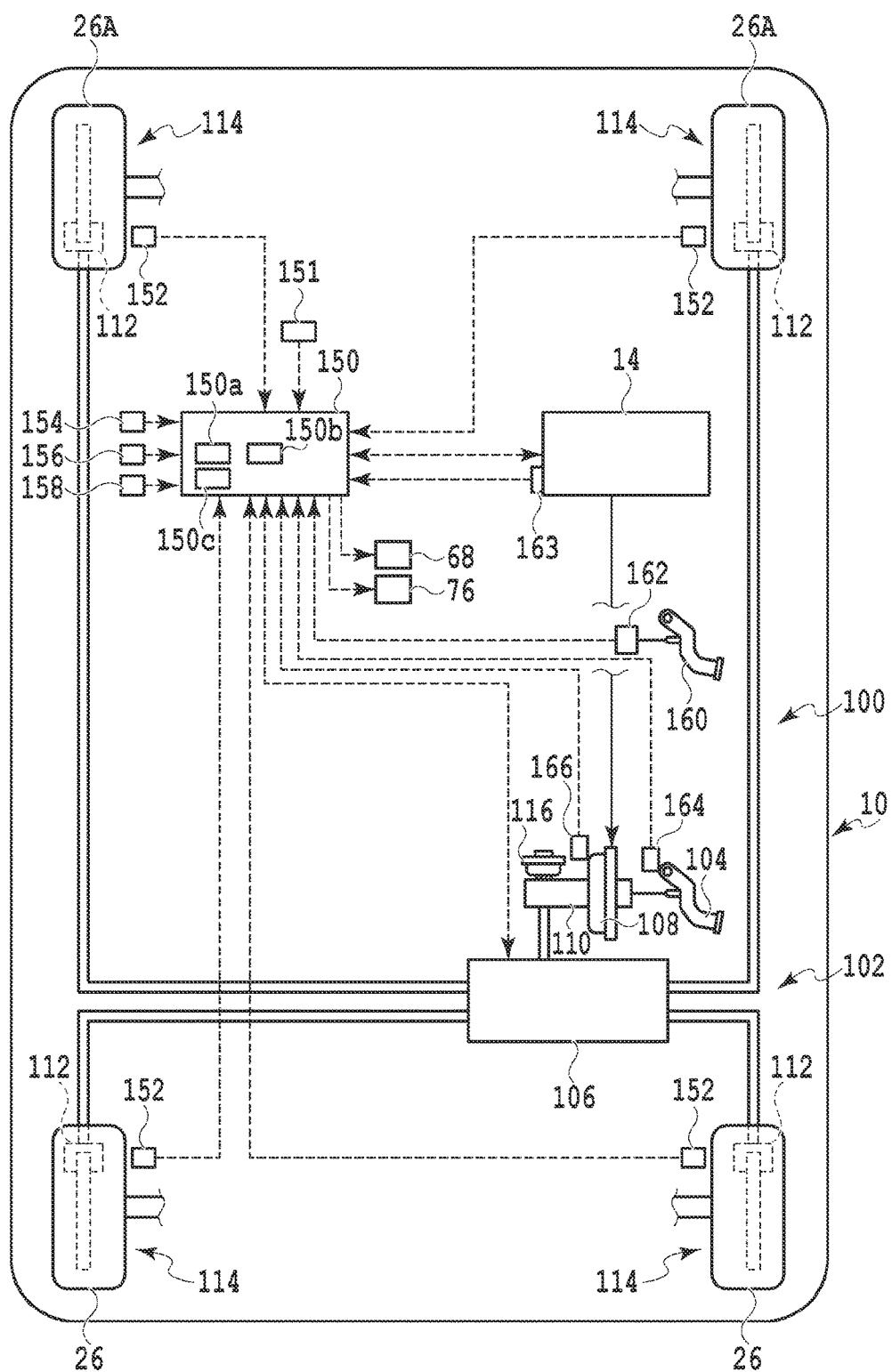
FIG. 2 is a diagram showing a brake system of the vehicle of FIG. 1.

FIG. 1 shows a power transmission system TM of a vehicle 10 according to an embodiment of the present disclosure. FIG. 2 shows a brake system 100 of the vehicle 10. First, the power transmission system TM will be described. While FIG. 1 shows a schematic configuration of a transverse transaxle 12 using as a transmission mechanism a belt-type continuously variable transmission mechanism, the present disclosure does not care about the drive type of a vehicle and so on. The transaxle 12 is coupled to an internal combustion engine (engine) 14 serving as a prime mover. The transaxle 12 includes, in the order in which power of the engine 14 is transmitted, a torque converter 16, a forward/reverse switching mechanism 18, a transmission mechanism 20, a speed reduction mechanism 22, and a final speed reduction mechanism 24. Drive shafts 28 extend from the final speed reduction mechanism 24 toward left and right drive wheels 26 and are coupled to the drive wheels 26, respectively.

A drive plate 32 is coupled to a crankshaft 30 of the engine 14, and the torque converter 16 is coupled to the crankshaft 30 via the drive plate 32. The torque converter 16 is a torque converter with a lock-up clutch. A pump impeller 34 on the output side of the torque converter 16 is coupled to an input shaft 36 extending from the forward reverse switching mechanism 18.

The forward/reverse switching mechanism 18 is a double-pinion type planetary gear mechanism in which two-tier pinions 42 and 44 are disposed between a sun gear 38 and a ring gear 40. The sun gear 38 is disposed coaxially on the input shaft 36 and rotated integrally with the input shaft 36. The ring gear 40 is disposed radially outward of the sun gear 38 and is coaxial with the input shaft 36. The pinions 42 and 44 mesh with each other. The inner pinions 42 mesh with the sun gear 38, while the outer pinions 44 mesh with the ring gear 40. The pinions 42 and 44 are supported by a carrier 46 so as to be rotatable on their own axes. The carrier 46 is supported so as to be rotatable about the axis of the input shaft 36, while the pinions 42 and 44 are orbitally rotatable around the input shaft 36. A forward clutch 48 that connects and disconnects the input shaft 36 and the carrier 46 to and from each other is provided on the input shaft 36. A reverse brake 50 that stops the rotation of the ring gear 40 is provided around the ring gear 40. The carrier 46 is coupled to a primary shaft 52 of the transmission mechanism 20.

During vehicle forward travel, the forward clutch 48 is engaged, while the reverse brake 50 is released. By the engagement of the forward clutch 48, an input from the input shaft 36 is transmitted to the primary shaft 52 via the carrier 46. On the other hand, during vehicle reverse travel, the forward clutch 48 is released, while the rotation of the ring gear 40 is stopped by the reverse brake 50. When the sun gear 38 is rotated in this state, the carrier 46 is rotated in a direction opposite to that of the sun gear 38. Therefore, the primary shaft 52 is rotated in a direction opposite to that of the input shaft 36, thereby making it possible to move the vehicle 10 backward.

The transmission mechanism 20 is configured as a belt-type continuously variable transmission. The transmission mechanism 20 includes the primary shaft 52 and a secondary shaft 54 disposed in parallel to each other, a primary pulley 56 and a secondary pulley 58 respectively disposed on the shafts 52 and 54, and a belt 60 wound around the pulleys 56 and 58.

The primary pulley 56 includes two sheaves 62 and 64 each having a conical surface. The sheaves 62 and 64 are disposed coaxially with the primary shaft 52 such that the conical surfaces thereof face each other. The one sheave 62 is integrally fixed to (or formed with) the primary shaft 52 and rotated together with the primary shaft 52. The sheave 62 will be referred to as a "fixed sheave". The other sheave 64 is movable on the primary shaft 52 along the axis of the primary shaft 52, but is rotated together with the primary shaft 52 in the rotation direction. The sheave 64 will be referred to as a "movable sheave". A V-shaped groove 66 is formed by the facing conical surfaces of the two sheaves 62 and 64. A hydraulic actuator 68 that drives the movable sheave 64 in its axial direction is provided at the back of the movable sheave 64. The width of the V-shaped groove 66 increases and decreases by the movement of the movable sheave 64 relative to the fixed sheave 62.

Like the primary pulley 56, the secondary pulley 58 includes a fixed sheave 70 and a movable sheave 72, and a V-shaped groove 74 is formed by conical surfaces of the two sheaves 70 and 72. A hydraulic actuator 76 is provided at the back of the movable sheave 72 for moving the movable sheave 72 in its axial direction.

The hydraulic actuators 68 and 76 are provided at the back of the movable sheaves 64 and 72 as described above and are each formed with a hydraulic pressure chamber (not shown). By controlling the operations of the hydraulic actuators 68 and 76 by a later-described ECU, supply and discharge of oil, to and from the hydraulic pressure chambers, pumped from a mechanical oil pump that is driven using power of the engine 14 are adjusted to control the movements of the movable sheaves 64 and 72.

The belt 60 is wound around the two pulleys 56 and 58 so as to be clamped in the V-shaped grooves 66 and 74 of the two pulleys 56 and 58. The belt 60 includes a plurality of elements 60a arranged in its circumferential direction, and the elements 60a are bundled by two rings. Side surfaces of the elements 60a are in contact with the conical surfaces of the sheaves 62, 64, 70, and 72 so as to be clamped to the pulleys 56 and 58. When the movable sheaves 64 and 72 are moved relative to the corresponding fixed sheaves 62 and 70 to increase and decrease the widths of the V-shaped grooves 66 and 74, the winding radius of the belt 60 changes correspondingly. The winding radius can be changed continuously, so that it is possible to obtain a continuously variable transmission mechanism that can continuously change the gear ratio. A speed reduction gear 80 is provided on the secondary shaft 54. The speed reduction gear 80 meshes with a driven-side speed reduction gear 82. The speed reduction mechanism 22 is constituted by the gears 80 and 82. Further, a final speed reduction pinion 84 is provided coaxially with the gear 82 via a shaft, and the pinion 84 meshes with a ring gear 88 coupled to a differential case 86 of the final speed reduction mechanism 24.

Next, the brake system 100 installed in the vehicle 10 will be described with reference to FIG. 2. The brake system 100 is configured to apply braking forces to wheels based on an operation state of a brake pedal 104 serving as a brake operating portion that is operated by a driver. The brake system 100 includes a brake assist system 102. The brake assist system 102 can function as a so-called VSC (Vehicle Stability Control) system. The brake assist system 102 is configured to be able to adjust braking forces (particularly, hydraulic braking pressures in this embodiment) that act on the wheels 26 and 26A of the vehicle 10. For example, the brake assist system 102 can function to control the turning state of the vehicle 10 so as to stabilize the behavior of the vehicle 10. The vehicle 10 has, as its wheels, the two wheels 26A in addition to the two drive wheels 26 described above.

The brake system 100 is operated according to an operation of the brake pedal 104, which is operated by the driver, so as to generate braking forces on the wheels 26 and 26A. The brake assist system 102 is configured to be able to adjust braking forces individually that act on the respective wheels 26 and 26A of the vehicle 10, and is installed in the brake system 100.

The brake assist system 102 includes a brake actuator 106 having the same configuration as that of a known VSC actuator. The brake actuator 106 corresponding to an actuator of the present disclosure that can adjust braking forces (hydraulic braking pressures) of wheels is a so-called vacuum-booster type hydraulic actuator, The vacuum-booster type brake actuator 106 can increase, decrease, and hold wheel cylinder hydraulic pressures independently for four Wheels and uses a device that amplifies a pedal depression force, input to the brake pedal 104 from the driver, by the use of negative pressure supplied from the engine 14. It is to be noted that the present disclosure does not exclude the use of an actuator, having a high-pressure accumulation mechanism such as an accumulator, as a brake actuator.

The brake system 100 includes a vacuum booster 108 serving as a negative-pressure boosting device that increases, using negative pressure, a pedal depression force (operation force) that is input to the brake pedal 104 as the brake operating portion by a driver's operation, a master cylinder 110 that gives a master cylinder pressure (master pressure) (operation pressure) to brake oil (working fluid) according to a pedal depression force increased by the vacuum booster 108, wheel cylinders 112 that are respectively provided in the wheels 26 and 26A and that are respectively applied with wheel cylinder pressures (hydraulic braking pressures) based on a master pressure so as to respectively generate braking forces on the wheels 26 and 26A, the brake actuator 106 serving as an actuator that can individually adjust braking forces to be generated on the wheels 26 and 26A by individually adjusting wheel cylinder pressures to be supplied to the wheel cylinders 112, hydraulic braking portions 114 each including a caliper, brake pads, a disc rotor, and so on, and a reservoir 116 that stores excess brake oil.

In the brake system 100, basically, a master pressure is given to brake oil by the master cylinder 110 according to a pedal depression force that acts on the brake pedal 104 by an operation of the brake pedal 104 by the driver. Then, in the brake system 100, this master pressure acts as wheel cylinder pressures in the respective wheel cylinders 112, so that the hydraulic braking portions 114 are operated to generate (or apply) braking forces on the wheels 26 and 26A.

More specifically, the brake pedal 104 is operated for braking according to a braking requirement by the driver when the driver wishes to brake the vehicle 10, i.e. to generate braking forces on the wheels 26 and 26A. The master cylinder 110 pressurizes brake oil by a piston that moves in association with the brake pedal 104 when a pedal depression force is input to the brake pedal 104 from the driver, thereby giving a master pressure to the brake oil according to the pedal depression force. That is, the master cylinder 110 converts a pedal depression force, which is input via the brake pedal 104, to a master pressure corresponding to this pedal depression force. The reservoir 116 is coupled to the master cylinder 110 such that brake oil is stored in the reservoir 116. The reservoir 116 and the master cylinder 110 communicate with each other in the state where the brake pedal 104 is not depressed, while when the brake pedal 104 is depressed, the communication therebetween is interrupted such that brake oil is pressurized in the master cylinder 110.

The vacuum booster 108 is integrally attached to the master cylinder 110 and is connected to an intake passage of the engine 14 via vacuum piping and so on so as to be supplied with negative pressure generated by the engine 14. The vacuum booster 108 can increase a pedal depression force, input to the brake pedal 104, by the use of negative pressure supplied from the engine 14. In this event, the vacuum booster 108 boosts (increases) the pedal depression force by a predetermined boost ratio corresponding to the supplied negative pressure and transmits the boosted pedal depression force to the piston of the master cylinder 110. By boosting the pedal depression force, input by the braking operation of the brake pedal 104, by the use of the negative pressure so as to increase the input of the pedal depression force to the master cylinder 110 relative to the input of the pedal depression force to the brake pedal 104, the vacuum booster 108 can decrease the input of the pedal depression force to the brake pedal 104 by he driver. As a result, the master cylinder 110 pressurizes brake oil according to the pedal depression force amplified by the vacuum booster 108 so as to give a master pressure to the brake oil.

The brake actuator 106 is provided on hydraulic pressure paths of brake oil connecting between the master cylinder 110 and the wheel cylinders 112 and makes it possible to increase and decrease hydraulic pressures in the respective wheel cylinders 112 based on control by an ECU, which will be described later, independently of the braking operation of the brake pedal 104, thereby controlling braking forces (hydraulic braking pressures) to be applied to the respective wheels 26 and 26A. The brake actuator 106 adjusts and controls wheel cylinder pressures, to be applied to the respective wheel cylinders 112, according to a master pressure given to brake oil by the master cylinder 110, or applies wheel cylinder pressures to the respective wheel cylinders 112 regardless of whether or not a master pressure is given to brake oil by the master cylinder 110.

The brake actuator 106 includes a hydraulic pressure control circuit (not shown) whose operation is controlled by a brake actuator control portion of the ECU. As is well known, the brake actuator 106 includes a plurality of pipes, an oil pump, hydraulic pressure pipes respectively connected to the wheel cylinders 112 respectively provided in the wheels 26 and 26A, a plurality of electromagnetic control valves for increasing, decreasing, and holding hydraulic pressures in the respective hydraulic pressure pipes, and so on. The brake actuator 106 is included in a braking force adjusting device of the present disclosure and functions as an operating device that can transmit the hydraulic pressure (master pressure) in each hydraulic pressure pipe to the corresponding wheel cylinder 112 as it is or by increasing or decreasing it according to a control command of the ECU.

During normal vehicle operation, for example, the oil pump and the predetermined electromagnetic control valve are driven according to a control command of the ECU such that the brake actuator 106 can adjust the wheel cylinder pressure, to be applied to the wheel cylinder 112, according to an operation amount (depression amount) of the brake pedal 104 by the driver. During vehicle control, for example, the oil pump and the predetermined electromagnetic control valve are driven according to a control command of the ECU such that the brake actuator 106 can be operated in a pressure increase mode that increases the wheel cylinder pressure to be applied to the wheel cylinder 112, a pressure hold mode that holds it substantially constant, a pressure decrease mode that decreases it, or the like. Based on control by the ECU, the brake actuator 106 can set such a mode for each of the wheel cylinders 112, respectively provided in the wheels 26 and 26A, according to a travel state of the vehicle 10.

The configuration of the general VSC system is conventionally known and, one example thereof is disclosed, for example, in International Publication No. WO 2012/147165. The brake assist system 102 and particularly the brake actuator 106 have the configurations of such a known VSC system and such a known VSC actuator. The brake actuator 106 may be the VSC actuator as it is.

The vehicle 10 is equipped with an electronic control unit (ECU) 150. The ECU 150 includes a computer and is configured to control the driving or operation of respective portions of the vehicle 10 (including the control of the engine 14). Specifically, the ECU 150 includes an electronic circuit having as its main component a well-known microcomputer including a CPU as an arithmetic unit, a ROM and a RAM as storage devices, and an interface, but is not limited to this configuration. Herein, the ECU 150 is representatively shown only in FIG. 2.

Electrically connected to the ECU 150 are various sensors (detection devices), such as, for example, a vehicle speed sensor 151 that detects a vehicle speed, wheel speed sensors 152 that respectively detect rotational speeds of the wheels 26 and 26A, a steering angle sensor 154 that detects a steering angle of the vehicle 10, a yaw rate sensor 156 that detects a yaw rate of the vehicle 10, an acceleration sensor 158 that detects an acceleration acting on a vehicle body of the vehicle 10, an accelerator opening degree sensor 162 that detects an accelerator opening degree corresponding to a depression amount of an accelerator pedal 160, a crank position sensor 163 as an engine speed sensor that detects a rotational speed of the crankshaft 30 of the engine 14, a brake switch 164 that is turned from an OFF state to an ON state when the brake pedal 104 is depressed, and a master pressure sensor 156 that detects a master pressure in the master cylinder 110. The ECU 150 executes a pre-stored control program based on various input signals that are input from the various sensors, various maps stored in advance or formed by learning, and so on, thereby outputting signals to the respective portions of the vehicle 10, such as the engine 14, the brake actuator 106, and the hydraulic actuators 68 and 76, so as to control the driving or operation of those portions. That is, the ECU 150 includes an actuator control portion 150a that controls the operation of the brake actuator 106.

Further, the ECU 150 includes a start-stop control portion 150b. The start-stop control portion 150b functions as a control portion of an engine stop system that stops the engine 14 when predetermined conditions, such as a condition that the brake pedal 104 is depressed by the driver during vehicle travel and thus that the traveling vehicle 10 is in a braked state, are satisfied.

The ECU 150 herein includes the start-stop control portion 150b and is configured to perform start-stop control during vehicle travel, in addition to idle stop control (idle reduction control) during vehicle stop (when the vehicle speed is zero). The start-stop control is a control that temporarily stops an engine even when a vehicle is operated (in a travel state) for the purpose of reducing fuel consumption and air pollution. The conditions for performing the start-stop control are stored in the start-stop control portion 150b. The start-stop control portion 150b stops the engine 14 when the conditions for starting the start-stop control (engine stop condition) are all satisfied. As the predetermined conditions for performing the start-stop control, it is defined that the brake pedal 104 is depressed (i.e. the vehicle 10 is in a braked state), that the vehicle speed is very small (less than or equal to a threshold value (e.g. less than or equal to 10 km/h)), and that the depression amount of the accelerator pedal 160 is zero. This does not exclude that another condition is additionally or alternatively set as a start-stop control start condition (engine stop condition). A description of idle stop control will be omitted.

Figure 3:
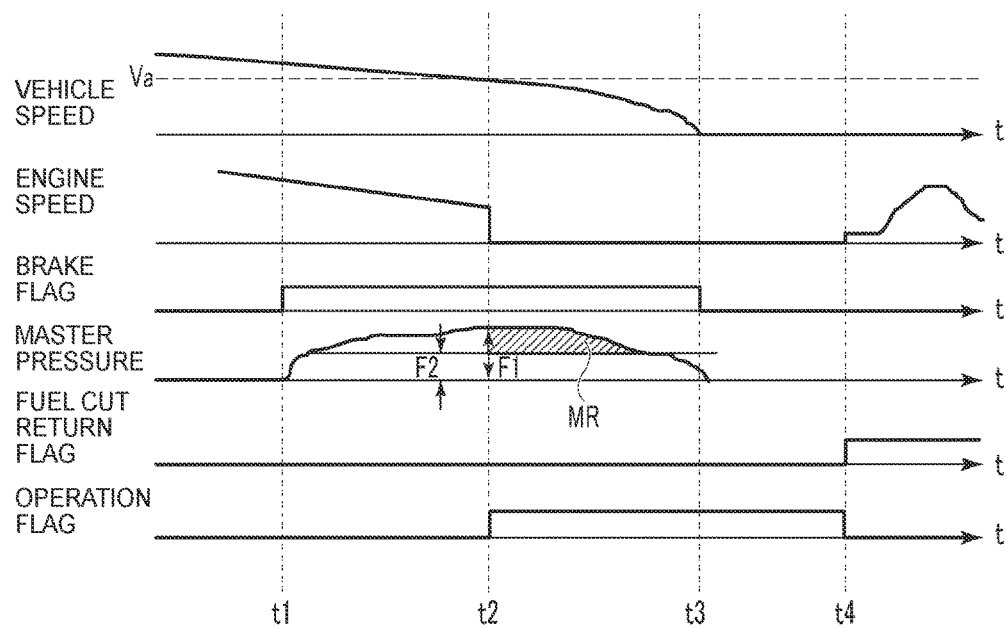
FIG. 3 is a time chart of start-stop control during vehicle travel.

Now, the start-stop control will be further described with reference to FIG. 3. FIG. 3 shows, in the order from the top, the change in vehicle speed, the change in engine speed, ON-OFF states of a brake flag, the change in master pressure, ON-OFF states of a fuel cut return flag that is turned on when the engine 14 returns from fuel cut, and ON-OFF states of an operation flag that is turned on when the engine 14 is in a stopped state by the execution of the start-stop control.

At time t1, when the brake pedal 104 is depressed during vehicle travel (when the vehicle speed is not zero), the brake flag is turned on. It is possible to detect from an output signal of the brake switch 164 whether or not the brake pedal 104 is depressed. With the depression of the brake pedal 104, the master pressure (detected based on an output of the master pressure sensor 166) increases. Since the brake pedal 104 is depressed, the traveling vehicle 10 is in a braked state, so that the vehicle speed decreases and the engine speed tends to decrease. In the case of FIG. 3, although not shown, when the brake pedal 104 is depressed, the accelerator pedal 160 is not depressed.

Then, at time t2, when the vehicle speed becomes less than or equal to a threshold value Va (e.g. less than or equal to 10 km/h), since the predetermined conditions (engine stop condition) described above are satisfied, the engine 14 is stopped. Accordingly, the engine speed becomes substantially zero. The operation flag of start-stop control changes from OFF to ON.

Then, since the brake pedal 104 continues to be depressed (since the brake flag is in the ON state), the vehicle 10 is decelerated and the vehicle speed becomes zero at time t3. The brake flag is turned off due to release of the brake pedal 104 by the driver, so that the master pressure decreases. Herein, since non-depression of the brake pedal 104 is not required as a predetermined engine restart condition of start-stop control, the start-stop control continues to be performed even after the brake flag is turned off.

Thereafter, when the driver depresses the accelerator pedal 160, the predetermined engine restart condition of start-stop control is established, so that the operation flag is turned off, the return flag is turned on, and the engine 14 is restarted according to a control command of the start-stop control portion 150b of the ECU 150. Consequently, the engine speed increases after time t4. At this time point, since the vehicle 10 has not yet moved, the vehicle speed still remains zero.

When the engine 14 is stopped during vehicle travel by the execution. of the start-stop control, since the mechanical oil pump described above is stopped, further pressure supply to the hydraulic pressure chambers of the hydraulic actuators 68 and 76 cannot be carried out, so that the pressures in those hydraulic pressure chambers decrease, This causes a decrease in the holding force of the belt 60 relative to the pulleys 56 and 58. Since the vehicle 10 is traveling, when the engine 14 is stopped, the transmission mechanism 20 is in a rotating state, so that the belt 60 is rotated along with the pulleys 56 and 58 so as to receive a belt thrust. However, when the holding force of the belt 60 relative to the pulleys 56 and 58 decreases, the belt 60 tends to slip relative to the pulleys 56 and 58.

On the other hand, when the start-stop control is performed, since braking forces are applied to the wheels, particularly to the drive wheels 26, a torque (reverse torque) in a direction opposite to the rotation torque until then is transmitted from the wheels to the transmission mechanism 20. This acts on the secondary pulley 58 in a direction to stop the rotation of the secondary pulley 58. Therefore, when the start-stop control is performed, the belt 60 still more tends to slip relative to the pulleys 56 and 58. Such slip tends to shorten the life of the belt 60.

Therefore, in the embodiment of the present disclosure, when the engine 14 is stopped during vehicle travel by the execution of the start-stop control, the brake actuator 106 is controlled so as to adjust braking forces to be applied to the wheels until the vehicle 10 is stopped. Hereinbelow, such control of this embodiment will be described with reference to FIGS. 4 to 6.

Figure 4:
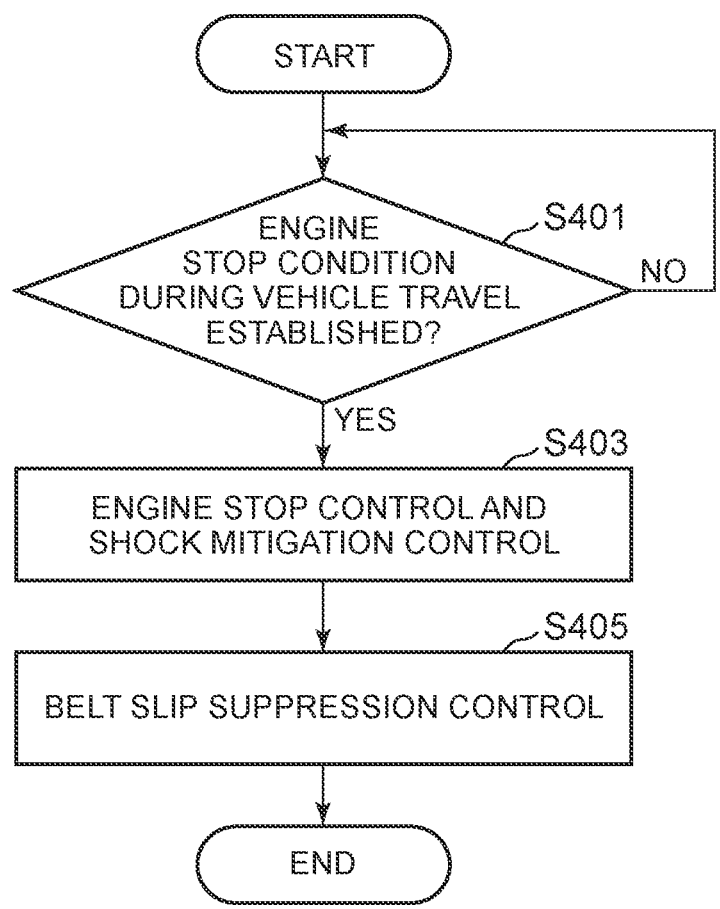
FIG. 4 is a flowchart for explaining control of the embodiment of FIG. 1.

Control of a flowchart of FIG. 4 is performed while the vehicle 10 is traveling. At step S401, it is determined whether or not the engine stop condition for performing the start-stop control is established, while the vehicle 10 is traveling. That is, it is determined whether or not the predetermined conditions described above are all satisfied. When the engine stop condition is established, an affirmative determination is made at step S401. Step S401 is repeated until the affirmative determination is made.

When the affirmative determination is made at step S401, the engine stop control is performed at step S403. Accordingly, the engine 14 is stopped. In order to prevent that an occupant such as a driver feels a sense of incongruity due to the occurrence of shock on the vehicle 10 by the stop of the engine 14 in this event, shock mitigation control (or shock suppression control) is performed. When the affirmative determination is made at step S401, the brake pedal 104 is depressed. The shock mitigation control is performed so as to suppress shock, which can occur on the vehicle 10, to a predetermined level (e.g. 0.1G) or less by adjusting braking forces, i.e. hydraulic braking pressures, that are applied to the wheels in this event. Specifically, by performing a calculation based on an output from the acceleration sensor 158 and using data that are set in advance based on experiments, the hydraulic braking pressures of the respective wheels are adjusted (e.g. decreased) so as to cancel an increase in the deceleration of the vehicle 10 caused by the stop of the engine 14. This is carried out by controlling the brake actuator 106 using the actuator control portion 150a of the ECU 150. This shock mitigation control can be performed so as to control braking forces of the specific wheels, such as, for example, only the drive wheels or only the wheels other than the drive wheels, without largely impairing a braking state required by the driver. This shock mitigation control is ended when the engine 14 is stopped.

At next step S405, belt slip suppression control is performed. While the belt 60 can slip relative to the pulleys 56 and 58 in the transmission mechanism 20 due to the phenomenon described above, the belt slip suppression control is a control that controls the brake actuator 106 so as to suppress such slip of the belt 60 relative to the pulleys 56 and 58, particularly to suppress such slip to within a predetermined range. In principle, the belt slip suppression control is performed until the vehicle 10 is stopped. The belt slip suppression control will be further described with reference to FIG. 5.

Figure 5:
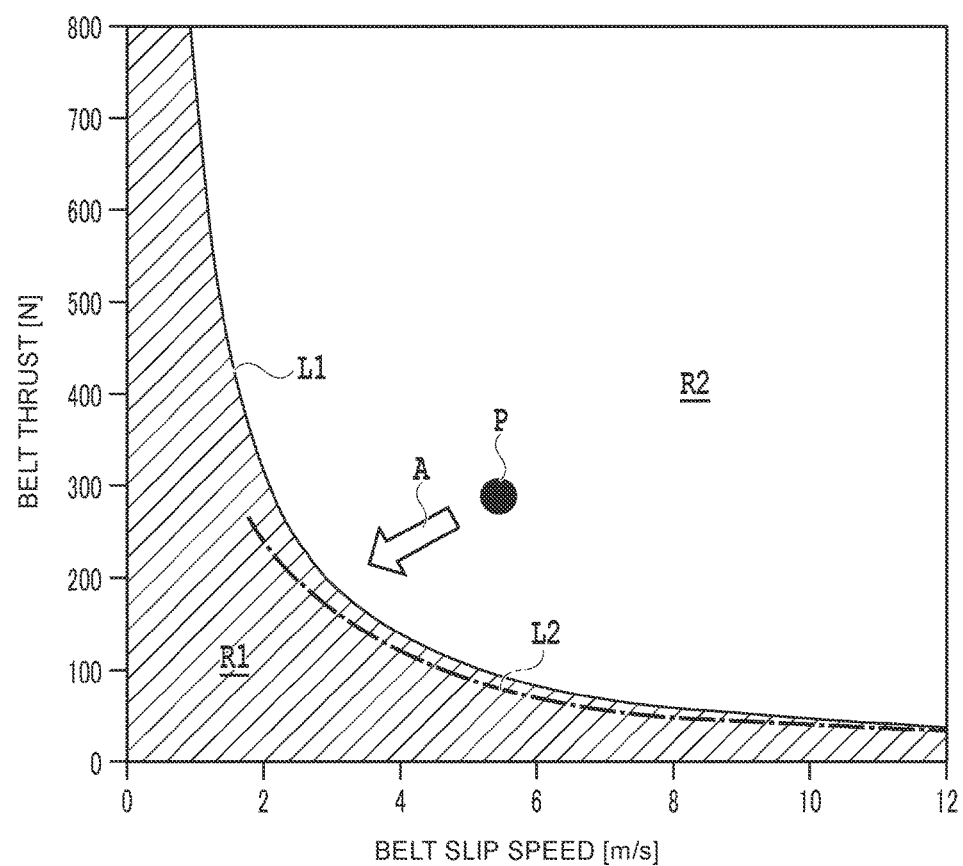
FIG. 5 is a graph showing the relationship between a belt slip speed and a belt thrust in a belt-type continuously variable transmission of the vehicle of FIG. 1.

FIG. 5 is a graph showing the belt damage possibility in a coordinate space having coordinate axes with the abscissa axis representing a slip speed of the belt 60 relative to the pulleys 56 and 58 in the continuously variable transmission mechanism 20 and the ordinate axis representing a force (belt thrust) that acts on the belt 60 so as to cause the belt 60 to rotate around the pulleys 56 and 58. In FIG. 5, a hatched region R1 on the lower-left side of a limit line L1 (a region on the side where the belt slip speed is slow and the belt thrust is small) is a region (non-damage region) where the slip degree of the belt does not affect damage to the belt, and is determined in advance based on experiments. In FIG. 5, a region on the upper-right side of the limit line L1 is determined to be a damage possibility region R2.

In the case where the driver applies a first depression force (corresponding to a master pressure F1 in FIG. 3) to the brake pedal 104 when the engine 14 is stopped during vehicle travel by the start-stop control, while the pulleys 56 and 58 are rotated along with the belt 60 in the transmission mechanism 20 until then, a force clamping the belt 60 (belt clamping pressure) becomes insufficient and a reverse torque in a direction to stop the pulley rotation acts on the secondary pulley 58. Consequently, the slip speed of the belt 60 (belt slip speed) relative to the pulleys 56 and 58 increases. Assuming that the relationship between the belt thrust and the belt slip speed in this event is a point P in FIG. 5, the belt 60 excessively slips relative to the pulleys 56 and 58 and there is a possibility of damage to the belt 60.

Therefore, in the belt slip suppression control, as shown by an arrow A in FIG. 5, the ECU 150 controls the brake actuator 106 regardless of an operation state of the brake pedal 104 such that the relationship between the belt thrust and the belt slip speed becomes a relationship within the non-damage region R1 in FIG. 5 (i.e. the slip of the belt relative to the pulleys is suppressed). Specifically, the ECU 150 has in advance mapped data as shown in FIG. 5 based on experiments and performs a calculation, determined in advance based on experiments, according to an operating state of the engine 14 (engine speed, etc.) at the time of engine stop (corresponding to time t2 in FIG. 3) and so on, thereby controlling the brake actuator 106 such that hydraulic braking pressures of the Wheels, particularly the drive wheels, are adjusted to cause the relationship between the belt thrust and the belt slip speed to coincide with a target operating line L2 provided in the non-damage region R1 in FIG. 5, in other words, such that braking forces to be applied to the wheels correspond to a second depression force different from the first depression force to the brake pedal 104. This is performed by the actuator control portion 150a of the ECU 150 and includes control of the electromagnetic control valves (not shown) of the brake actuator 106. Consequently, when the operation state of the brake pedal 104 by the driver is such that the belt slip speed (the slip degree of the belt relative to the pulleys) is too fast, the master pressure is decreased by a portion (F1–F2) as shown in FIG. 3 so as to suppress particularly the belt slip speed, so that braking forces to the wheels are suppressed to braking forces (corresponding to the second depression force) lower than required. braking forces (corresponding to the first depression force) required by the driver. The decreased portion of the master pressure corresponds to a decreased region MR of the master pressure in FIG. 3, while the master pressure in the decreased state corresponds to the master pressure F2

(F2<F1) in FIG. 3. This control for the brake actuator 106 is preferably continued until the vehicle speed becomes zero.

As described above, the belt slip suppression control is performed such that the relationship between the belt thrust and the belt slip speed continues to have the relationship in the non-damage region R1 in FIG. 5. However, in the belt slip suppression control of this embodiment, when an input to the brake pedal 104 by the driver corresponds to the damage possibility region R2, the control amount to the brake actuator 106 by the belt slip suppression control is preferably suppressed to be small. In FIG. 5, the target operating line L2 is drawn in the non-damage region R1 approximately along the limit line L1 indicating a predetermined allowable limit of belt slip, while being spaced from the limit line L1. The target operating line L2 is a line that is determined in advance so as to prevent belt damage more reliably, For example, the target operating line L2 is determined so as to pass through values obtained by subtracting about 5% from values (e.g. belt thrust values) of respective portions of the limit line L1. In this embodiment, when the relationship between the belt thrust and the belt slip speed is located on the damage possibility region R2 side with respect to the target operating line L2, the control for the brake actuator 106 is performed regardless of a depression amount (i.e. an operation state) of the brake pedal 104 such that the relationship between the belt thrust and the belt slip speed transitions along the target operating line L2. Consequently, it is possible to allow the belt 60 to slip relative to the pulleys 56 and 58 in a range not exceeding the predetermined allowable limit of belt slip (corresponding to the limit line L1), while reliably preventing belt damage, so that it is possible to allow the travel state of the vehicle to approach a braking state that is close to a braking requirement desired by the driver.

The present disclosure does not exclude that when the relationship between the belt thrust and the belt slip speed corresponding to a depression force of the brake pedal 104 by the driver is located in the non-damage region R1 from the beginning, the brake actuator 106 is controlled such that the master pressure is increased or decreased to allow the relationship between the belt thrust and the belt slip speed to transition along the target operating line L2. However, it is preferable that such control be performed only when the relationship between the belt thrust and the belt slip speed corresponding to a driver's requirement has a relationship on the damage possibility region R2 side with respect to the limit line L1 or the target operating line L2. With this configuration, it is possible to further reduce the possibility that the driver or the like may feel a sense of incongruity. When the engine 14 has reached a stopped state, the belt slip suppression control is ended.

The brake actuator 106 can increase, decrease, and hold wheel cylinder hydraulic pressures independently for four wheels and uses a device that amplifies a pedal depression force, input to the brake pedal 104 from the driver, by the use of negative pressure supplied from the engine 14. Since there is normally sufficient negative pressure (residual pressure) from the stop of the engine until the vehicle is stopped (during the execution of the belt slip suppression control at step S405), it is possible to sufficiently perform the belt slip suppression control.

Figure 6:
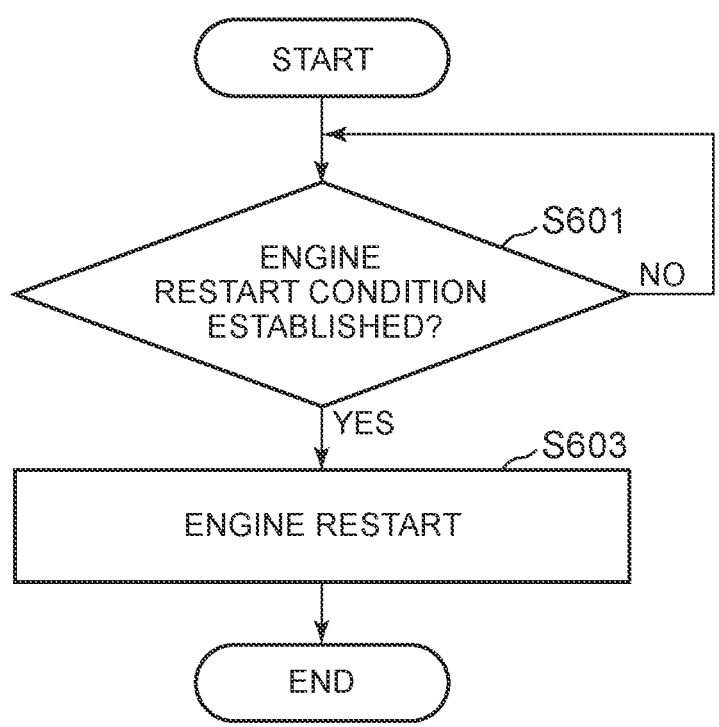
FIG. 6 is a flowchart for explaining control of the embodiment of FIG. 1.

Then, when the vehicle 10 is in a stopped state by the start-stop control (when the operation flag in FIG. 3 is in an ON state), control of a flowchart of FIG. 6 is performed. At step S601, it is determined whether or not the engine restart condition is established. When the driver depresses the accelerator pedal 160 after the vehicle is stopped, an affirmative determination is made at step S601 in FIG. 6. As the engine restart condition, it is defined that the depression amount of the accelerator pedal 160 is greater than zero (i.e. the accelerator pedal is depressed). However, the engine restart condition may alternatively or additionally include another condition.

When the affirmative determination is made at step S601, the start-stop control portion 150b of the ECU 150 restarts the engine 14 at step S603. Accordingly, the start-stop control is ended.

In order to more suitably perform the belt slip suppression control (step S405) and the shock mitigation control (step S403), the ECU 150 may further include a correction portion 150c. Every time the brake pedal 104 is operated by the driver during vehicle travel (every time the brake switch 164 is turned on), the ECU 150 updatably stores, in the storage device, a vehicle speed, a slip ratio ((vehicle speed−wheel speed)/vehicle speed×100 (%)), and a deceleration (e.g. stores 20 sets while updating them) that are obtained when the deceleration greater than or equal to a predetermined level starts to occur on the vehicle 10 by the operation of the brake pedal 104 (i.e. at almost zero-touch points with the brake pads and the calipers). These values can be obtained based on outputs of the sensors described above and predetermined known calculations. Then, the correction portion 150c of the ECU 150 performs a predetermined calculation and so on based on the correlation between them, thereby calculating a correction value for the data of FIG. 5. Then, using this correction value, the actuator control portion 150a may correct the control amount (based on the data of FIG. 5) to the brake actuator 106. Therefore, the correction portion 150c may be called a learning portion. By such learning, even when, for example, the brake pads are new or worn away, it is possible to suitably perform the belt slip suppression control and the shock mitigation control.

In the case where the vehicle is equipped with a detection device that measures an inter-vehicle distance or the like, the belt slip suppression control (step S405) may be positively performed when, for example, the inter-vehicle distance is greater than or equal to a predetermined distance.

Embodiments of the present disclosure are not limited only to the embodiment described above. Any modifications, applications, and equivalents that are included in the ideas of the present disclosure defined by the claims are included in the present disclosure.

What is claimed is:

1. A vehicle comprising:
    an engine configured to generate a hydraulic pressure while the engine is driven;
    a continuously variable transmission including a pulley and a belt, the pulley configured to rotate along with rotation of a wheel of the vehicle, the pulley configured to clamp the belt by the hydraulic pressure that is generated while the engine is driven;
    an engine stop system configured to perform control to stop driving of the engine when a predetermined engine stop condition is satisfied during travel of the vehicle; and
    a brake system configured to control a braking force of the wheel based on an operation state of a brake operating portion that is operated by a driver, the brake system including a braking force adjusting device, the braking force adjusting device including an actuator and an electronic control unit, the actuator configured to adjust a braking force of the wheel, the electronic control unit configured to, when the engine stop system stops the driving of the engine, control the actuator such that slip of the belt relative to the pulley becomes less than or equal to a predetermined allowable limit.

2. The vehicle according to claim 1, wherein the electronic control unit is configured to, when the predetermined engine stop condition is satisfied and the driving of the engine is stopped by the engine stop system, control the actuator such that shock that occurs on the vehicle due to stop of the driving of the engine becomes less than or equal to a predetermined level.

3. The vehicle according to claim 1, wherein the electronic control unit is configured to store, during travel of the vehicle, a vehicle speed, a slip ratio, and a deceleration that are obtained when a deceleration greater than or equal to a predetermined level starts to occur on the vehicle by an operation of the brake operating portion by the driver, and the electronic control unit is configured to correct a control amount, for controlling the actuator, based on the vehicle speed, the slip ratio, and the deceleration obtained when the deceleration greater than or equal to the predetermined level starts to occur on the vehicle.

4. The vehicle according to claim 2, wherein the electronic control unit is configured to store, during travel of the vehicle, a vehicle speed, a slip ratio, and a deceleration that are obtained when a deceleration greater than or equal to a predetermined level starts to occur on the vehicle by an operation of the brake operating portion by the driver, and the electronic control unit is configured to correct a control amount, for controlling the actuator, based on the vehicle speed, the slip ratio, and the deceleration obtained when the deceleration greater than or equal to the predetermined level starts to occur on the vehicle.

* * * * *